(12) United States Patent
Arksey (10) Patent No.: US 7,568,438 B2
(45) Date of Patent: Aug. 4, 2009

(54) DISC FURROW OPENER AND METHOD FOR SINGLE PASS PLACEMENT OF SEED AND FERTILIZER

(75) Inventor: Donald Arksey, Brandon (CA)

(73) Assignee: Atom Jet Industries (2002) Ltd., Brandon, CA (US)

( * ) Notice: Subject to any disclaimer, the term of this patent is extended or adjusted under 35 U.S.C. 154(b) by 0 days.

(21) Appl. No.: 12/037,238

(22) Filed: Feb. 26, 2008

(65) Prior Publication Data

US 2008/0229986 A1 Sep. 25, 2008

Related U.S. Application Data

(60) Provisional application No. 60/896,589, filed on Mar. 23, 2007.

(51) Int. Cl.
*A01C 7/00* (2006.01)
*A01C 9/00* (2006.01)
*A01C 23/00* (2006.01)

(52) U.S. Cl. .................. 111/121; 111/123; 111/187; 111/188

(58) Field of Classification Search ......... 111/118–129, 111/13, 170, 174–188, 200, 900
See application file for complete search history.

(56) References Cited

U.S. PATENT DOCUMENTS 4,674,747 A * 6/1987 Mazzocco et al. ........... 473/296
7,152,539 B2 12/2006 Swanson

FOREIGN PATENT DOCUMENTS

CA 2125533 12/1995

* cited by examiner

*Primary Examiner*—Christopher J. Novosad
(74) *Attorney, Agent, or Firm*—Ade & Company Inc.; Ryan W. Dupuis; Kyle R. Satterthwaite

(57) ABSTRACT

A disc furrow opener and method for single pass placement of seed and fertilizer in agricultural planting uses a scraper to both scrape the disc and form a seed shelf in the furrow formed thereby and delivers seed onto the seed shelf and fertilizer into a bottom portion of the open furrow formed by the disc below the seed shelf. Placement of seed and fertilizer is achievable in a single pass over the area to be seeded without need for a second opening implement rearward of the disc and without being limited to the use of liquid fertilizer.

18 Claims, 8 Drawing Sheets

DISC FURROW OPENER AND METHOD FOR SINGLE PASS PLACEMENT OF SEED AND FERTILIZER

This application claims the benefit under 35 U.S.C.119(e) of U.S. provisional application Ser. No. 60/896,589, filed Mar. 23, 2007.

The present invention relates generally to furrow openers and methods of planting agricultural crops, and more particularly to disc furrow openers and methods capable of simultaneously delivering seed and fertilizer.

BACKGROUND OF THE INVENTION

In agriculture, no-till planting practices, in which the planting process is adapted to minimize soil disturbance to leave organic matter from the previous crop grown in a field in place, are commonly applied in the production of various crops. Some furrow openers, or drills, use rotatable discs to fracture the soil into furrows of disturbed soil into which seed can be placed. It is known to form a seed bed, or shelf or ledge, above the furrow bottom using a scraper positioned to also clean the disc, thereby allowing for seed placement on this shelf to avoid the placement of seed amongst the higher level of residue or debris that may be found at the furrow bottom. However, without careful seed placement on the narrow shelf, seeds may drop from the seed shelf deeper into the furrow, potentially causing poor or inconsistence emergence of the crop resulting from the fallen seeds being disposed too far beneath the surface. This improper placement of the seeds may result from seeds bouncing from a well-formed seed shelf after discharge from the seed tube or from a poorly defined seed shelf that is not adequate to receive or support and retain the seeds.

Conventional no-till planting practices sometimes include the process of making a separate pass over a field to deposit fertilizer either on the surface or in the top soil. In order to eliminate the need for additional passes, openers have been developed that both place the seed on a seed shelf formed by the opener and deposit fertilizer into the field.

Canadian Patent Application No. 2,125,533 teaches an opener having a fertilizer tube mounted in proximity to a disc to deposit fertilizer into the bottom of the furrow formed thereby. A seed tube is supported rearward of the disc and includes a hoe opener mounted to the front side thereof to form a shallow seed shelf in an upwardly directed face of the furrow onto which seed is delivered for positioning above and to the side of the fertilizer. The soil coming off the back edge of the disc falls down over the furrow in a self-closing action, so that when the seed shelf is formed by the trailing hoe opener, the seed deposited thereon cannot fall deeper into the furrow.

However, it is desirable to provide a disc opener which can help prevent the seed from falling from the seed shelf deeper into the furrow without the need for an additional opening implement carried rearward of the furrow-forming disc.

U.S. Pat. No. 7,152,539 teaches an embodiment of an opener having a scraper defined by a body that extends away from the disc and then rearward to situate a seed tube between the body and the disc. The bottom edge of the scraper body extending away from the disc forms a seed shelf in the side of the disc-formed furrow onto which seed is deposited by the seed tube. Liquid fertilizer is delivered under pressure to a nozzle disposed on a side of the body opposite feed tube to inject the fertilizer into the soil on a side of the seed shelf opposite the furrow bottom. This arrangement is limited to use with liquid fertilizer, as the pressure thereof is relied upon to deliver the fertilizer to the desired depth in the soil. Also, it may still be possible for the seeds to fall into the furrow bottom toward the disc.

Therefore, it is desirable to provide a disc opener which facilitates the deposit of seeds and either of liquid and granular fertilizers in a single pass without the need for an additional opening implement carried rearward of the furrow-forming disc.

SUMMARY OF THE INVENTION

According to one aspect of the invention there is provided a disc furrow opener comprising:

a mounting arm;

a disc rotatably supported on the mounting arm for pulling therewith in a forward working direction to open a furrow in the ground;

a scraper carried with the mounting arm on a trailing side of the disc and defining a front scraper edge positioned to scrape soil buildup from the disc, the scraper extending away from the front scraper edge at a lower end thereof to trail the front scraper edge in the forward working direction and extend away from the disc along a generally horizontal plane disposed upward from a lowermost point on the disc to form a seed shelf in a respective side of the furrow;

a seed delivery device operable to discharge seed therefrom through a seed outlet thereon into the furrow, the seed delivery device being carried with the mounting arm with the seed outlet situated on the trailing side of the disc in a position trailing the front scraper edge of the scraper in the forward working direction to deposit the seed onto the seed shelf; and a fertilizer delivery device operable to discharge fertilizer therefrom through a fertilizer outlet thereon into the furrow, the fertilizer delivery device being carried with the mounting arm and having the fertilizer outlet situated on the trailing side of the disc and in a position trailing the front scraper edge of the scraper in the forward working direction to deposit fertilizer into a bottom portion of the furrow below the seed shelf.

Preferably the seed outlet on the seed delivery device is closer, along the disc, to the front scraper edge than the fertilizer outlet on the fertilizer delivery device.

Preferably the scraper comprises a scraper plate defining the front scraper edge and having a bottom edge extending away therefrom at a lower end thereof in the generally horizontal plane at an oblique angle to the disc.

Preferably there is provided a seed shelf projection extending from the scraper plate to a side thereof opposite the disc to define a width of the seed shelf.

Preferably the seed shelf projection is formed of a harder material than the scraper plate.

Preferably the seed shelf projection comprises carbide.

Preferably the seed outlet discharges seed to a side of the seed delivery device opposite the disc.

Preferably the seed outlet defines a seed guide surface which slopes downwardly away from the disc.

Preferably the fertilizer outlet on the fertilizer delivery device trails the scraper plate.

Preferably the seed outlet on the seed delivery device trails the scraper plate in the forward working direction.

Preferably at least a portion of the seed delivery device is disposed between the scraper plate and the disc to block movement of the scraper plate toward the disc past a side of the seed outlet facing away therefrom.

Preferably the seed delivery device comprises a seed tube extending downward to the seed outlet and a blocking projection fixed to the seed tube and extending therefrom to a blocking position between the scraper plate and the disc.

Preferably the fertilizer delivery device trails the seed delivery device in the forward working direction.

Preferably the seed delivery device and the fertilizer delivery device comprise a seed tube and a fertilizer tube fastened together.

Preferably the seed outlet and the fertilizer outlet are adjacent one another.

Preferably the fertilizer outlet opens to a side of the fertilizer delivery device opposite the scraper edge in the forward working direction.

Preferably the fertilizer outlet comprises a fertilizer guide surface which slopes downwardly away from the scraper edge in the forward working direction.

According to another aspect of the invention there is provided a method for single pass placement of seed and fertilizer, said method comprising the steps of:

(a) mounting a scraper to one side of a rotatable disc with a scraper edge of the scraper positioned adjacent the disc and a lower edge of the scraper extending from the scraper edge obliquely away from the disc in a generally horizontal plane;

(b) mounting a fertilizer delivery device and a seed delivery device to the same side of the disc as the scraper within a distance from the disc, perpendicular to a rotational plane thereof, to an end of the lower edge of the scraper opposite the scraper edge;

(c) pulling the disc through the soil to open a furrow;

(d) pulling the scraper through the furrow to form a seed shelf in a side of the furrow;

(e) delivering seed through the seed delivery device onto the seed shelf prior to filling in a bottom portion of the furrow below the seed shelf; and (f) simultaneously delivering fertilizer through the fertilizer delivery device into the bottom portion of the furrow below the seed ledge.

According to yet another aspect of the invention there is provided a scraper device arranged to be installed on a furrow opener operable to move in a forward working direction, the furrow opener comprising a disc carried in the forward working direction over ground to open a furrow of disturbed soil therein and a seed tube extending downward adjacent the disc to deposit seeds into the furrow, the scraper device comprising:

a scraper body defining a front scraper edge arranged to scrape the disc and a bottom edge extending away from the front scraper edge at a lower end thereof and arranged to trail the front scraper edge during movement in the forward working direction and extend obliquely away from the disc in a generally horizontal plane disposed upward from a lowermost point on the disc to form a seed shelf in a respective side of the furrow; and a seed shelf firming body connected to the scraper body and comprising a bottom surface extending from the lower end of the front scraper edge along the bottom edge, the seed shelf firming body being arranged to position the bottom surface within the generally horizontal plane and span a greater distance from the bottom edge toward the disc in a direction measured along the bottom edge away from the scraper edge to pack the seed shelf;

the scraper body being arranged to position the front scraper edge in a position leading the seed tube in the forward working direction, position the bottom surface of the seed shelf firming body between the lowest point on the disc and a bottom end of the seed tube, and extend from the front scraper edge proximate the disc to a side of the seed tube opposite the disc.

The seed shelf firming body acts to pack down or firm the seed shelf formed by the displacement of soil away from the disc by the bottom edge of the scraper body. This firming or packing action acts to promote a flat, smooth seed shelf that is less likely to crumble or allow a seed to fall therefrom deeper into the furrow formed by the disc.

Preferably the seed shelf firming body is arranged to extend from the front scraper edge to beneath the seed tube.

Preferably a seed positioning surface extends upward from a lower end thereof proximate an end of the seed shelf firming body opposite the scraper edge to an upper end, the seed positioning surface being arranged to position the upper end thereof above an outlet of the seed tube in a position leading the seed tube in the forward working direction.

The upper end of the seed positioning surface may be disposed at a distance from the lower end of the seed positioning surface in a direction measured along the bottom surface of the seed shelf firming body toward an end thereof proximate the scraper edge.

Preferably the seed shelf firming body is disposed entirely between the bottom end of the seed tube and the lowest point on the disc.

Preferably there is provided carbide disposed along at least a portion of the bottom edge of the scraper body.

Preferably there is provided carbide disposed along a lower portion of the front scraper edge proximate the bottom edge of the scraper body.

Preferably the scraper body comprises a plate to which the seed shelf firming body is secured.

Preferably there is provided a side deflector body connected to the scraper body and disposed on a side of the seed shelf firming body opposite the bottom edge of the scraper body, the side deflector body being arranged to extend between the seed tube and the disc in a position trailing the scraper edge in the forward working direction to block the seeds from failing off the seed shelf deeper into the furrow.

According to a further aspect of the invention there is provided a scraper device arranged to be installed on a furrow opener operable to move in a forward working direction, the furrow opener comprising a disc carried in the forward working direction over ground to open a furrow of disturbed soil therein and a seed tube extending downward adjacent the disc to deposit seeds into the furrow, the scraper device comprising:

a scraper body defining a front scraper edge arranged to scrape the disc and a bottom edge extending away from the front scraper edge at a lower end thereof and arranged to trail the front scraper edge during movement in the forward working direction and extend obliquely away from the disc in a generally horizontal plane disposed upward from a lowermost point on the disc to form a seed shelf in a respective side of the furrow;

the scraper body being arranged to position the front scraper edge in a position leading the seed tube in the forward working direction and extend from the front scraper edge proximate the disc to a side of the seed tube opposite the disc; and a side deflector body connected to the scraper body and extending in a direction away from the front scraper edge, the side deflector body being arranged to extend to the seed tube between the seed tube and the disc in a position trailing the scraper edge in the forward working direction to block the seeds from falling off the seed shelf deeper into the furrow.

Preferably the side deflector body is arranged to extend past the seed tube in the direction away from the scraper edge.

Preferably the scraper body and the side deflector body each comprise a respective plate.

Preferably a bottom of the side deflector body is arranged for extending in the generally horizontal plane in which the bottom edge of the scraper body extends.

Preferably a space defined between the scraper body and the deflecting body is closed at a bottom thereof from the scraper edge along at least a portion of the bottom edge.

Preferably the space defined between the scraper body and deflecting body is closed from the scraper edge to an end of the scraper body opposite the scraper edge.

Preferably a seed shelf firming body closes the bottom of the space defined between the scraper body and the deflecting body, the seed shelf firming body being arranged to position a bottom surface thereof within the generally horizontal plane.

Preferably a seed positioning surface disposed between the scraper body and the side deflector body extends upward from a lower end proximate an end of the seed shelf firming body opposite the scraper edge to an upper end, the seed positioning surface being arranged to position the upper end thereof above an outlet of the seed tube in a position leading the seed tube in the forward working direction.

Preferably there is provided a rear deflector body supported on, and projecting from one toward another of, the side deflector body and the scraper body, the rear deflector body being arranged to be supported in a position trailing the seed tube in the forward working direction at a distance above the horizontal plane to allow relative rearward motion of the seeds past the rear deflector body therebeneath.

Preferably the rear deflector body is supported on the side deflector body projecting away therefrom toward the scraper body, the rear deflector body defining a gap between the rear deflector body and the scraper body to allow relative rearward motion of the seeds past the rear deflector body through the gap.

Preferably the rear deflector body is contoured to define a concave surface thereof facing toward the scraper edge and arranged to guide the seeds away from the side deflector body toward the scraper body during relative rearward motion of the seeds from the seed tube.

Preferably the rear deflector body is arranged to be connectable to the seed tube to depend downward therefrom.

Preferably a lower portion of the rear deflector body depending downward from a seed tube connection of the rear deflector body flares outward therefrom in a direction opposite the scraper edge, the rear deflector body being arranged to position a bottom end thereof in a position trailing the bottom edge of the scraper body.

Preferably there is provided a fertilizer tube having an outlet supported on a side deflector body opposite the scraper body, the side deflector body being arranged to be spaced from the disc to position the outlet of the fertilizer tube between the side deflector body and the disc.

The scraper device may be provided in combination with a fertilizer delivery system arranged for carrying on the furrow opener, the fertilizer delivery system comprising a fertilizer tube having an outlet and being arranged to depend downward on a same side of the disc as the seed tube, wherein the side deflector body is arranged to be spaced from the disc to receive the outlet of the fertilizer tube between the side deflector body and the disc.

Preferably the side deflector body is arranged to receive the outlet of the fertilizer tube between the side deflector body and the disc in a position trailing the seed tube in the forward working direction.

Preferably a surface of the side deflector body opposite the scraper body comprises a portion recessed toward the scraper body to support the fertilizer tube in closer proximity thereto.

According to yet another aspect of the invention, there is provided a scraper device arranged to be installed on a furrow opener operable to move in a forward working direction, the furrow opener comprising a disc carried in the forward working direction over ground to open a furrow of disturbed soil therein and a seed tube extending downward adjacent the disc to deposit seeds into the furrow, the scraper device comprising:

a scraper body defining a front scraper edge arranged to scrape the disc and a bottom edge extending away from the front scraper edge at a lower end thereof and arranged to trail the front scraper edge during movement in the forward working direction and extend obliquely away from the disc in a generally horizontal plane disposed upward from a lowermost point on the disc to form a seed shelf in a respective side of the furrow;

the scraper body being arranged to position the front scraper edge in a position leading the seed tube in the forward working direction and extend from the front scraper edge proximate the disc to a side of the seed tube opposite the disc; and a fertilizer tube support connected to the scraper at a distance from the scraper edge thereof and arranged to extend to a side of the seed tube opposite the scraper body between the seed tube and the disc.

Preferably there is provided a fertilizer tube mounted to the fertilizer tube support, the fertilizer tube support being arranged to position an outlet of the fertilizer tube between the seed tube and the disc.

Preferably the fertilizer tube support is arranged to extend to a position trailing the seed tube in the forward working direction.

BRIEF DESCRIPTION OF THE DRAWINGS

In the accompanying drawings, which illustrate exemplary embodiments of the present invention.

DETAILED DESCRIPTION

Figures 1, 6:
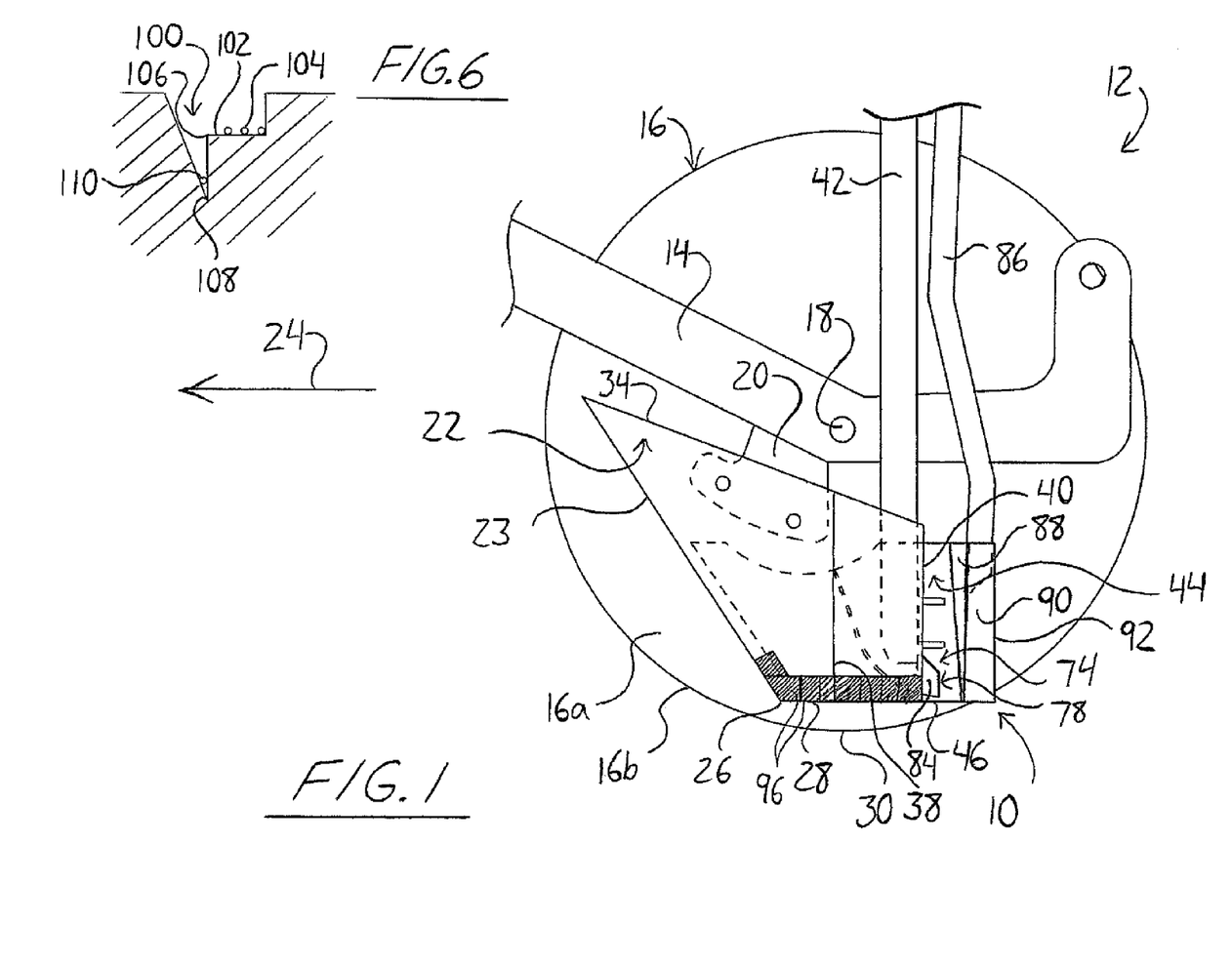
FIG. 1 is a schematic side elevational assembly view of a scraper device according to a first embodiment of the invention mounted on a disc furrow opener.
FIG. 6 is a cross sectional view of a furrow formed in the earth by a scraper device of the present invention.

FIG. 1 shows a scraper device 10 mounted to an existing conventional disc opener 12 in place of an existing scraper thereof. The opener 12 features a carrying arm 14 on which a disc 16 is supported for fee rotation about an axle 18 in a manner well-known to those of skill in the art. The carrying arm 14 is pulled on the drawbar (not shown) of a seeder driven in a forward working direction with the disc 16 angled relative thereto, thereby defining opposite surfaces of the disc as leading and trailing faces. The scraper device 10 is fastened to an existing scraper mount 20 depending downward from the carrying arm 14, which is disposed on the same side of the disc 16 as the trailing face 16a thereof. A scraper plate 22 defines a scraper edge 23 positioned in close proximity to the trailing face 16a of the disc 16 in a manner well-known to those of skill in the art so as to scrape soil from the disc during operation of the opener 12.

In the following description, the terms forward, rearward, leading, trailing and variations of these words are used relative to the forward working direction in which the opener 12 is pulled, unless otherwise indicated. Arrow 24 of FIG. 1 may be used as a general indication of the forward working direction, but it should be appreciated that the direction indicated by the arrow 24 angles somewhat into the two-dimensional drawing plane due to the aforementioned angled orientation of the disc 16 relative to the forward working direction of the seeder.

A front bottom corner 26 is defined at the lower end of the scraper edge 23 where it meets with a bottom edge 28 of the scraper plate 22, which extends rearward from the front bottom corner 26 and obliquely away from the trailing face 16a of the disc 16. The bottom edge 28 extends within a generally horizontal plane situated a distance above a lowermost point 30 in the rotational path of the disc's periphery 16b, which defines a bottom of the furrow trench formed in the soil by the opener. A pair of mounting holes 32 in the scraper plate adjacent but spaced from a top edge 34 thereof are positioned to align with respective holes 36 in the scraper mount 20 for the receipt of fasteners, such as bolts, therethrough to mount the scraper device 10 and position the bottom edge 28 of the scraper plate upward from the lowermost point 30 in the disc periphery's rotational path about the axle 18 in a horizontal orientation.

A bend 38 is provided in the scraper plate 22 at a distance rearward from the scraper edge 23 along the bottom edge 28 past the distance therealong at which the rearmost of the mounting holes 32 is disposed. Rearward of the bend 38, the angle of the bottom edge 28 of the scraper plate 22 relative to the disc reduces from that found between the scraper edge 32 and the bend 38. The bottom edge 28 of the scraper plate 22 continues rearward from the bend 38 to a rear edge 40 of the scraper plate 22 extending vertically upward therefrom. An existing seed tube 42 depends downward past the carrying arm 14 between the disc 16 and the scraper plate 22 just forward of the rear edge 40 thereof.

In operation, the opener 12 is pulled in the forward working direction with the disc 16 disposed at an oblique acute angle relative angle thereto thereby forming a furrow in the earth by disrupting the soil. The scraper plate 22 extending laterally from the trailing face 16a of the disc 16 displaces soil outward away therefrom, which with the bottom edge 28 extending within a horizontal plane, creates a horizontal seed shelf in the side of the furrow the trailing face 16a is oriented to face. The seed tube 42, having its discharge outlet disposed between the scraper plate 20 and the trailing face 16a of the disc 16, thus drops seeds from a position directly above the seed shelf formed by the scraper plate 20.

A side deflector plate 44 is welded to the scraper plate 20 proximate the scraper edge 23 thereof to extend rearward therefrom along, although not necessarily parallel, to the disc 16. The oblique angle of the scraper plate 22 relative to the disc 16 extending laterally away therefrom and rearward widens the space defined between the scraper plate 22 and the side deflector plate 44 moving rearward away from the scraper edge 23, at least up to the bend 38 in the scraper plate 20. The side deflector plate 44 extends rearward away from the scraper edge 23 to the seed tube 42 and continues past the rear edge 40 of the scraper plate 20 between the disc 16 and the seed tube 42. A bottom edge 46 of the side deflector plate 44 extends within the same horizontal plane as the bottom edge 28 of the scraper plate 28 and the side deflector projects upward from the bottom edge 46 almost the full height of the rear edge 40 of the scraper plate 20. Welded to the scraper plate 20 near the scraper edge 23 at the forwardmost end thereof and extending reward therefrom past the seed tube 42, the side deflector plate 44 thus blocks any seed discharged downward from the seed tube 42 from traversing the edge of the seed shelf formed by the scraper plate 20 down into the bottom of the furrow formed by the disc.

Figure 2:
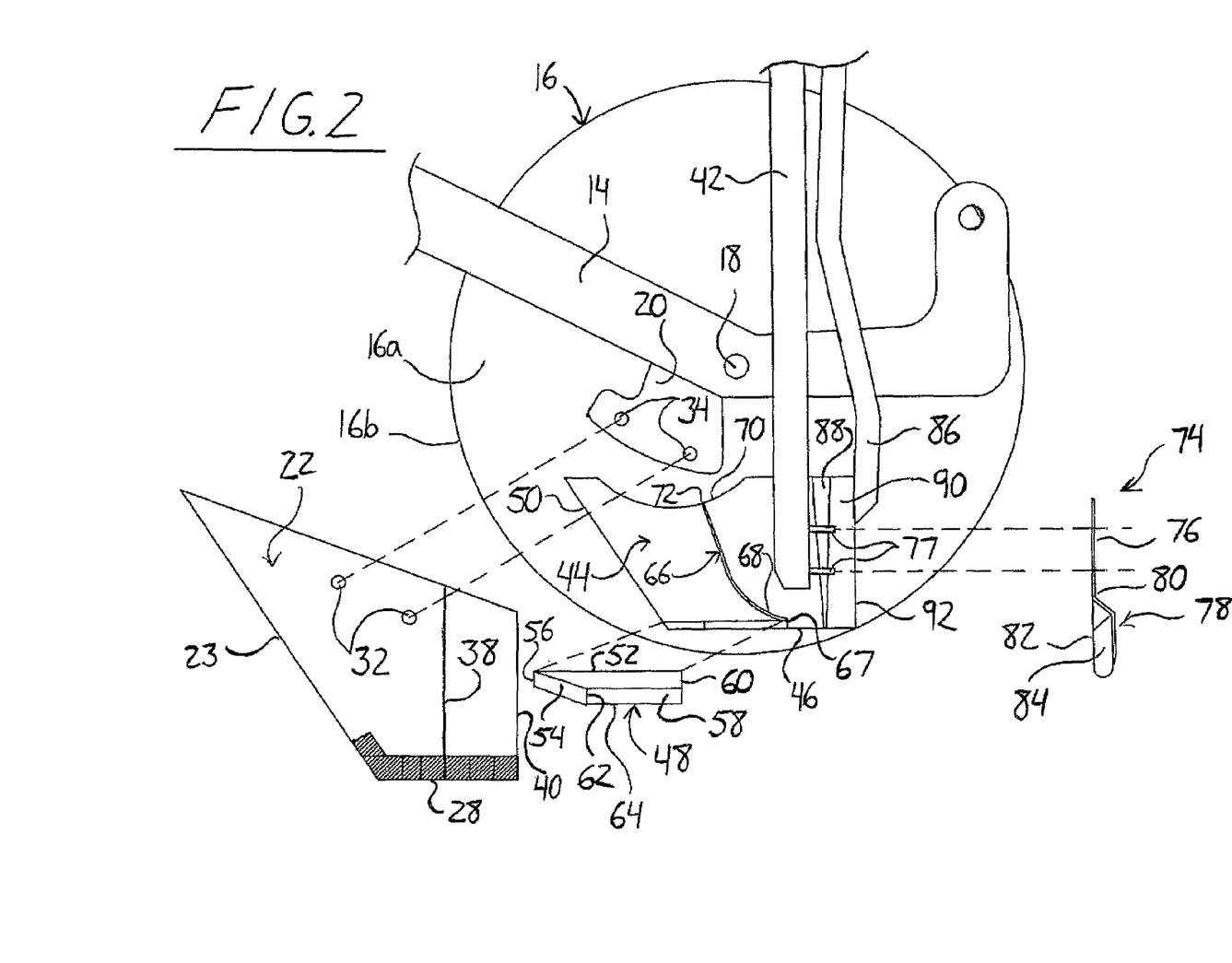
FIG. 2 is a schematic side elevational exploded view of the scraper device of FIG. 1.
Figure 3:
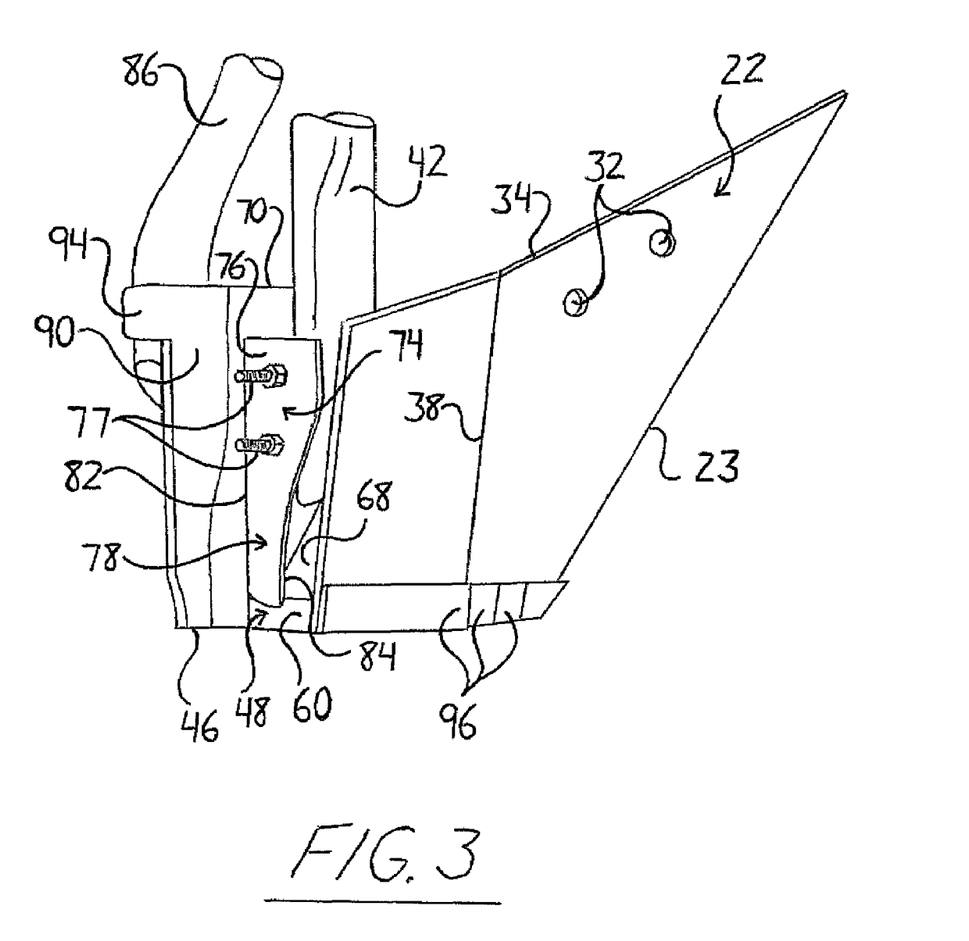
FIG. 3 is a perspective view of the scraper device of FIG. 1 from a rear side angle.

As best seen in FIG. 2, a firming plate 48 is provided between the scraper plate 22 and the side deflector plate 44 along the bottom edges 28, 46 thereof to close the space or cavity formed between the scraper and side deflector plates 22, 44 from the connection of these plates proximate the scraper edge 23 of the scraper plate 22 rearward to the rear edge 40 thereof. The forwardmost edge 50 of the flat side deflector plate 44 is sloped obliquely upward from the bottom edge 36 thereof to sit flush against the portion of the scraper plate 22 extending obliquely laterally away from the disc 16 proximate the scraper edge 23. The cavity between the scraper and side deflector plates 22, 44 is closed on two sides by these plates and at the bottom by the firming plate 48.

The firming plate 48 has a flat inner edge 52 disposed closest to the disc 16 for fitting flush against the flat side deflector plate 44 to extend rearward therealong from the forwardmost edge 50 thereof. A side of the firming plate 48 opposite the flat inner edge 52 has a sloped portion 54 that intersects with the inner edge 52 to define a point or corner 56 at the front of the firming plate 48 and extends rearward from this point obliquely away from the inner edge 52 to widen the firming plate in a rearward direction away from the point 56 at the connection of the scraper and side deflector plates 22, 44 proximate the scraper edge 23. In the illustrated embodiment, the spacing between the scraper plate 22 and the side deflector plate has a generally constant width (i.e. horizontal distance from plate to plate) rearward of the bend 38 in a direction parallel to the bottom edge 46 of the side deflector plate 44. Therefore, a second portion 58 of the side of the firming plate 48 opposite the flat inner edge 52 extending rearward from the sloped portion 54 extends parallel to the flat inner edge 52. The overall appearance of the firming plate 48 can thus be described as a right-angled triangular portion widening rearward from the front end of the firming plate toward an integral rectangular portion projecting rearward from the triangular portion to the rear end 60 of the firming plate.

With the firming plate received between and welded to the scraper plate 22 and the side deflector plate 44, the corner 62 formed by the intersection of the sloped portion 54 and second portion 58 of the side of the firming body 48 opposite the flat inner edge 52 is situated against the bend 38 of the scraper plate 22 in alignment therewith. The width of the rectangular portion of the firming body 48 defined between the flat inner edge 52 and the second portion 58 of the side thereopposite corresponds with the width of the spacing between the scraper and inner deflector plates 22, 44 along the bottom edges 26, 46 thereof rearward of the bend 38, while the slope of the sloped portion 54 of the side of the firming plate opposite the flat inner edge 52 thereof corresponds to that of the portion of the bottom edge 28 of the scraper body 22 disposed forward of the bend 38 and extending obliquely from the disc 16, relative to the side deflector plate 44. The opening at the bottom of the cavity defined between the scraper and side deflector plates 22, 44 forward of the rear edge of the scraper plate 22 is thus entirely closed by the firming plate.

The planar bottom surface 64 of the firming plate 48 is disposed flush with the bottom edges 28, 46 of the scraper and side deflector plates 22, 44 so as to be situated in the same horizontal plane. The horizontally disposed firming plate 48 thus acts to pack the seed shelf formed by the displacement of soil by the portion of the bottom edge 28 of the scraper body 22 extending obliquely laterally away from the disc 16 to the bend 38 and the portion of the scraper body projecting upward therefrom. Irregularities in the seed shelf left in the trail of the relatively thin bottom edge 28 forward of the bend 38 are thus flattened out by the bottom surface 64 of the firming plate 48 to define a flat shelf of well-packed soil beneath the scraper device 10. This packing or firming action helps prevent crumbling of the seed shelf and rolling of seeds off the seed shelf down into the disc-formed furrow due to an unflat seed shelf.

The firming plate 48 and the side deflector plate 44 thus operate to promote optimal seed placement, as the firming plate 48 promotes a firm, flat seed shelf while the side deflector plate 44 retains seeds thereon by blocking motion of the seeds over the edge of the well-defined seed shelf.

To prevent seeds discharged from the seed tube 42 from coming to rest atop the firming plate 48 and therefore being carried forward with the scraper device 10 rather than deposited on the seed shelf as desired, a seed positioning plate 66 is welded in place atop the firming plate 48 to slope downward from thereabove rearward toward the rear edge 40 of the scraper plate 22, to which the firming plate 48 extends. A lower end 67 of the positioning plate 66 sits atop the firming plate 48 at the rear end 60 thereof and the positioning plate 66 curves upward and forward therefrom to form an upwardly concave face 68 directed toward the seed tube depending downward above the firming plate 48 and positioning plate 66 proximate the rear end 40 of the scraper plate 22. From an end of the curved portion opposite the lower end 67, the positioning plate 66 continues linearly upward and forward toward a top edge 70 of the side deflector plate 44 that, as shown, may have an upwardly facing concave portion formed in an otherwise linear edge to avoid interfering with the existing scraper mount 20. The positioning plate 66 spans fully from the scraper plate 22 to the side deflector plate 44 so that any seed that becomes situated atop the positioning plate 66 cannot fall therepast down onto the firming plate 48. In the illustrated embodiment, an upper end 72 of the positioning plate 66 does not extend forward past the bend 38 in the scraper plate 22, as extending beyond this point would require increasing the complexity of the positioning plate's shape in order to span fully from the scraper plate 22 to the side deflector plate 44 along its entire length.

The seed positioning plate 66 thus defines a sloped surface extending downward and rearward above the bottom surface 64 of the firming plate 48 to the rear end 66 of the firming plate such that any seed that becomes situated on this surface will tend to slide downward and rearward off the firming plate 48 for depositing on the seed shelf rearward of the firming plate passing thereover.

It should be appreciated that this seed positioning surface may be provided in other ways. For example, a top surface, or at least a portion thereof proximate the rear end 60, of the firming plate 48 opposite the bottom surface 64 thereof may be sloped rearward and downward toward the rear end 60 to encourage similar sliding of a seed down and rearward from the firming plate 48. FIG. 5 shows a second embodiment in which the seed positioning plate 66' is planar and vertically oriented in a position just leading the seed tube 42'. The firming plate 48' is shortened from that of the embodiment of FIGS. 1 to 4 so as to dispose its rear end 60' forward of the seed tube 42' to meet the positioning plate 66' proximate the lower end 67' thereof. The upper end 72' of the positioning plate 66' is disposed at the top edge 70' of the side deflector plate so as to be positioned well above the seed tube outlet. In the second embodiment, the seed positioning plate 66' thus blocks access to the top of the firming plate 48' so that any seed dropped from the seed tube 42' is forced to drop directly down to the seed shelf formed in the soil.

To even further improve control over the positioning of seed delivered through the seed tube 42, a rear deflector plate 74 is provided at the rear end 40 of the scraper plate 22 in the space between the scraper and side deflector plates 22, 44. A flat upper portion 76 is secured to the existing seed tube 42 by bolts 77 and projects laterally from the side deflector plate 44 toward, but not quite reaching the scraper plate 22. The rear deflector plate 74 may also, or alternatively, be fastened to the side deflector plate 44, for example by a flange projecting forward from the upper portion 76 along the side deflector plate 44 for welding thereto (see FIG. 4). Beneath the flat upper portion 76, the rear deflector plate 74 is bent to form a curved shroud 78 that flares rearward from the bottom 80 of the upper portion 76 and from a side edge 82 of the rear deflector plate positioned at the side deflector plate 44 and coplanar with the flat upper portion 76. The curved shroud 76 forms a horizontally and vertically concave surface 84 facing forward so as to guide seeds discharged by the seed tube 42 both downward and laterally away from the side deflector plate 44 when slid along this surface.

The rear deflector plate does not extend fully down to the horizontal plane in which the bottom edges 28 and 46 of the scraper and side deflector plates 22, 44 and the bottom surface 48 of the firming plate lie, but rather depends downward to where the lower end 67 of the seed positioning plate 68 sits atop the firming plate 48. This leaves a space beneath the rear deflector plate 74 so that a seed dropping down between the rear end 60 of the firming plate 48 and the shroud 78 can pass rearward relative to the scraper device 10 past the rear deflector plate. In other words, the seed having dropped onto the seed shelf is not disrupted as the rear deflector plate 74 passes thereover as the scraper device 10 is carried in the forward working direction. Similarly, a gap is left between the rear deflector plate 74 and the scraper plate 22 to allow seeds moving rearward relative to the scraper device 10 to pass by the rear deflector plate 74 at an edge thereof opposite the side deflector plate 44. This is desirable as it places the seed at an end of the seed shelf opposite the free edge thereof past which the seed would drop deeper into the furrow.

A fertilizer tube 86 is connected to the side deflector plate 44 on a side thereof opposite the seed tube 42 between the disc 16 and the side deflector plate 44 and has an upper end adapted for connection to the flexible delivery hose of a fertilizer delivery system (not shown). Located on the side of the side deflector plate 44 opposite the seed tube 42, the fertilizer tube 86 is arranged to discharge fertilizer into the bottom of the furrow so as to position the fertilizer below and to the side of the seed shelf onto which seeds are deposited by the seed tube 42. As the device deposits fertilizer into the furrow formed by the disc 16 and therefore does not rely on fluid pressure to inject the fertilizer into the soil, the device may be used to deliver either liquid or granular fertilizer.

Figure 4:
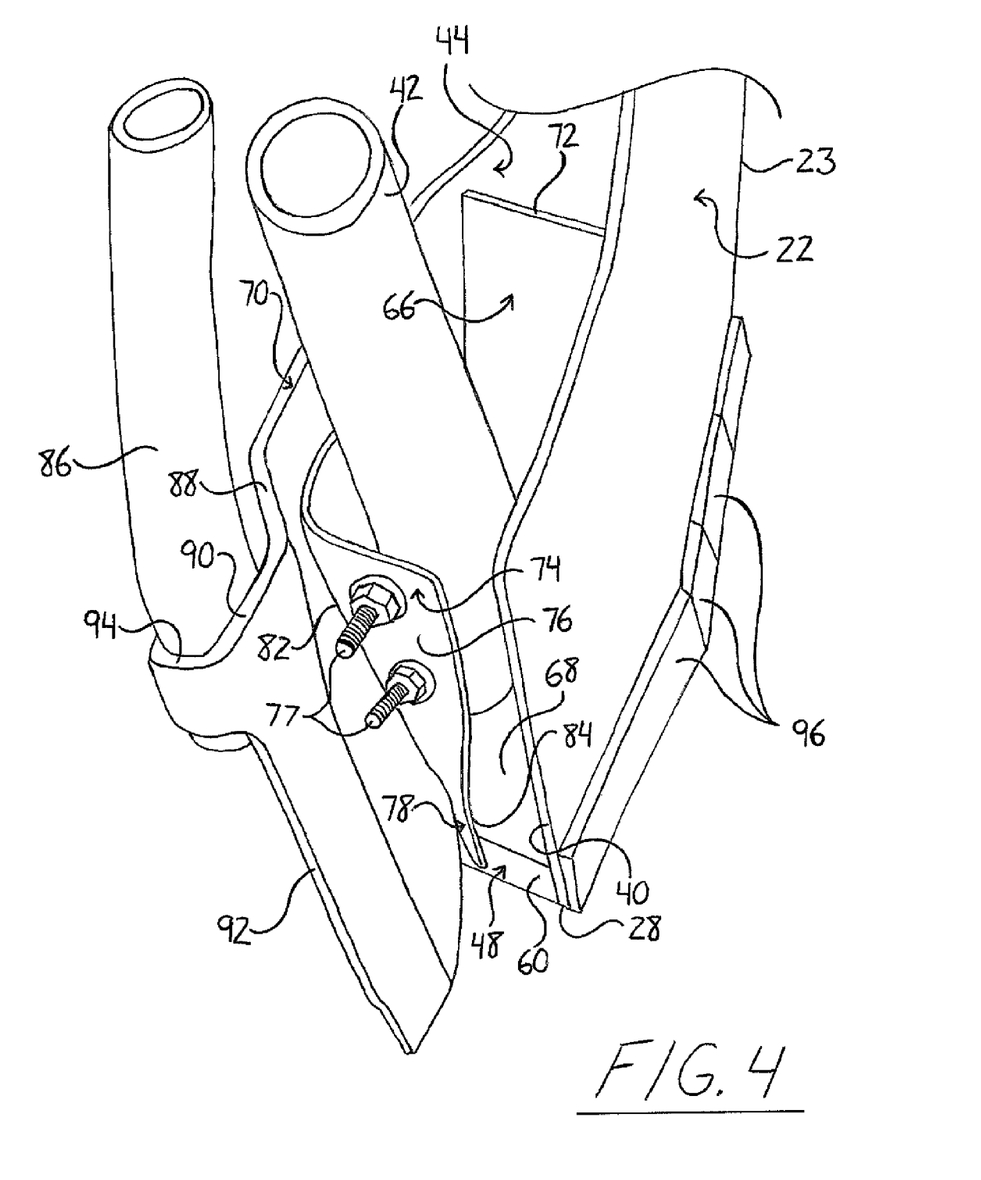
FIG. 4 is a perspective view of the scraper device of FIG. 1 from a rear overhead angle.
Figure 5:
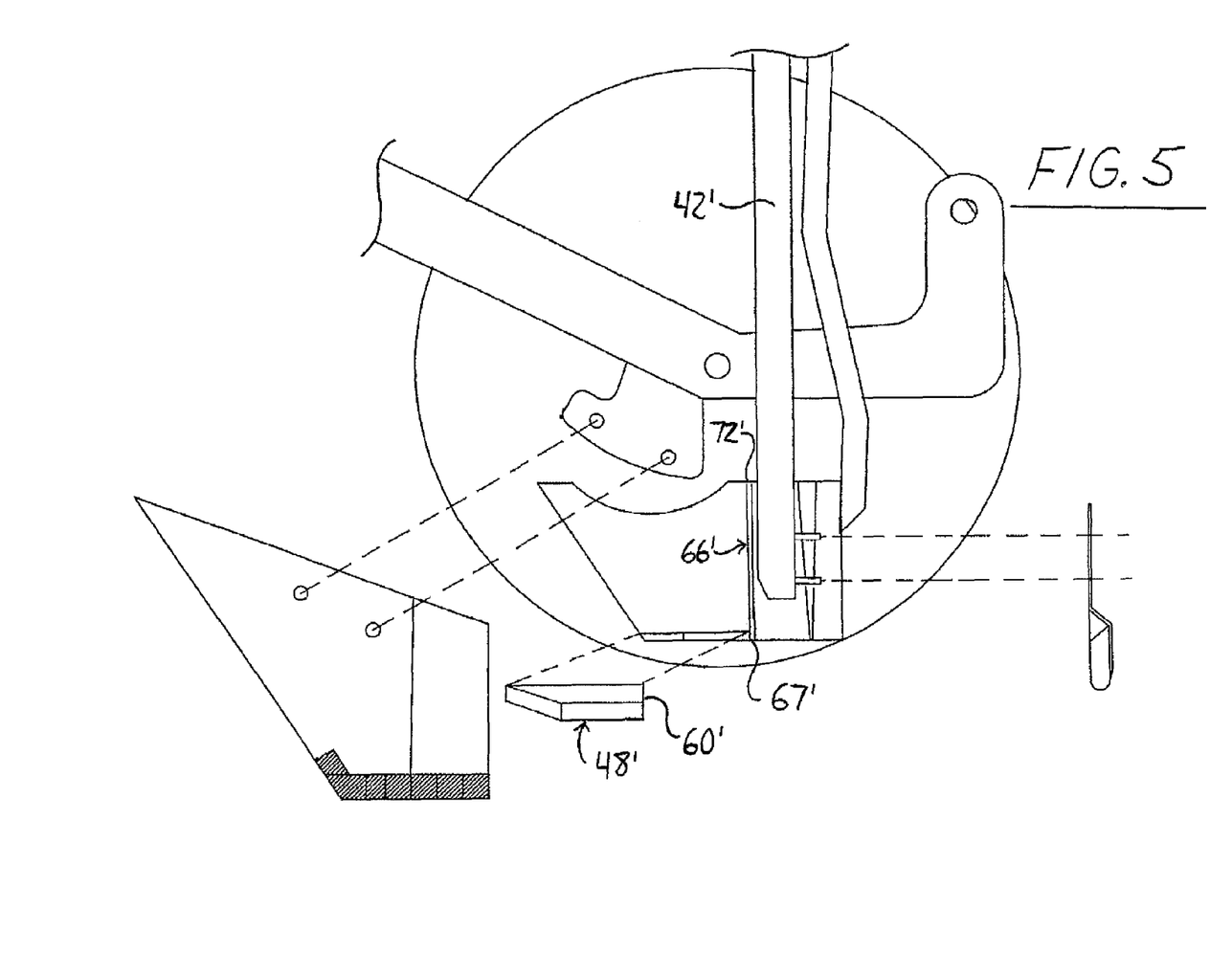
FIG. 5 is a schematic side elevational exploded view of a scraper device according to a second embodiment of the present invention.

In order to accommodate the outlet of the fertilizer tube 86 in the relatively narrow spacing between the disc 16 and the side deflector plate 44, the side deflector plate 44 is bent just rearward of the seed tube 42 to slope rearward and away from the trailing disc face 16a toward the seed tube 42 and scraper plate 22, as best shown in FIG. 4. The side deflector plate 44 then bends again rearward of the sloped portion 88 to be substantially parallel to the flat portion of the side deflector plate forward of the sloped portion 88. This parallel portion 90 defines a recess from the surface or face of the side deflector plate opposite the scraper body 22 and nearest the disc 16 forward of the sloped portion 88. From an upper end of the rear edge 92 of the side deflector plate 44 at the end of the parallel portion 90 opposite the sloped portion 88, a U-shaped mounting tab 94 projects rearward at the upper edge 70 of the side deflector plate before curving through 180 degrees to extend back toward the parallel portion 90 from which it projects between the parallel portion 90 and the disc 16. This forms a receiving cavity between the parallel portion 90 and the U-shaped mounting tab 94 in which the fertilizer tube 86 is received for clamping by the U-shaped mounting tab 94 to support the outlet of the fertilizer tube therebelow. So secured in the rearward end of the side deflector plate 44 recessed from the rest thereof in a direction opposite the disc 16, the fertilizer tube 86 is supported by the side deflector plate 44 for carrying with the scraper plate 22 and the rest of the scraper device 10.

To improve wear resistance, carbide pieces 96 are provided end-to-end along the bottom edge 28 of the scrape plate 22 on the face or surface thereof opposite the disc 16 to improve wear resistance of the scraper device 10 along the bottom edge 28. This improves the wear life of the device, which reduces replacement frequency, and protects the bottom edge 28 that may otherwise wear quickly, leading to an undesirable decrease in seed shelf smoothness.

Prototypes of the forgoing embodiments of the invention have been produced with a stainless steel fertilizer tube, tungsten carbide edge protecting pieces and steel side deflector, rear deflector, seed positioning, shelf firming and scraper plates. The steel plates are welded together while the tungsten carbide pieces are brazed to the scraper plate with silver solder. It should be appreciated that the scraper device 10 may be produced using other materials or production methods. For example, it may be possible to produce a scraper device having the features presented herein above using casting techniques to produce a device having an outer bottom edge for displacing soil to form the seed shelf, a planar bottom surface projecting from the outer bottom edge to firm the shelf and a side deflector wall blocking motion of seeds over the edge of the seed shelf down into the bottom of the furrow without welding plates together to define these features. Such a device would provide a scraper body, a seed shelf firming body and a side deflector body without requiring the assembly of separate distinct plates.

The present invention allows the placement of fertilizer in the ground as well as seed in the same operation. The device mounts to the existing scraper mounting apparatus or other part of the frame of the opener. Fertilizer is delivered via a flexible hose from a supply tank to the present invention's chute or tube, It includes the scraper to remove soil from the disc during operation and allow for a cavity running in the shadow of the disc to allow for both seed and fertilizer to be properly incorporated into the soil. The device creates the seed shelf using the horizontal firming plate as well as the inside deflector body to ensure proper seed placement and allows for a cavity whereby the fertilizer can be properly incorporated. The scraper portion of the invention has carbide inserts installed for optimum wear characteristics. The carbide inserts are helpful in maintaining the ability to form a proper seed shelf as such ability is reduced as the scraper wears.

FIG. 6 shows the relative positioning of seed and fertilizer deposited into the earth by the scraper device 10. The disc 16 pulled at a slight angle to the forward working direction forms the furrow 100, while the scraper plate 22 forces soil laterally away from the trailing face 16a of the disc to form the seed shelf 102. The firming plate 48 packs the upper surface of the seed shelf 102 to provide a sturdy defined ledge onto which seeds 104 are deposited after being discharged from the seed tube 42. The side deflector plate 44 prevents these seeds from falling off the edge 106 of the seed shelf 102 toward the furrow bottom 108. Positioned on the side of the side deflector plate 44 opposite the seed tube 42 between the side deflector plate 44 and the trailing face 16a of the disc, the fertilizer tube discharges fertilizer, for example granular fertilizer 110, which falls directly into the furrow 100, down past the seed shelf 102 toward the furrow bottom 108.

Figure 7:
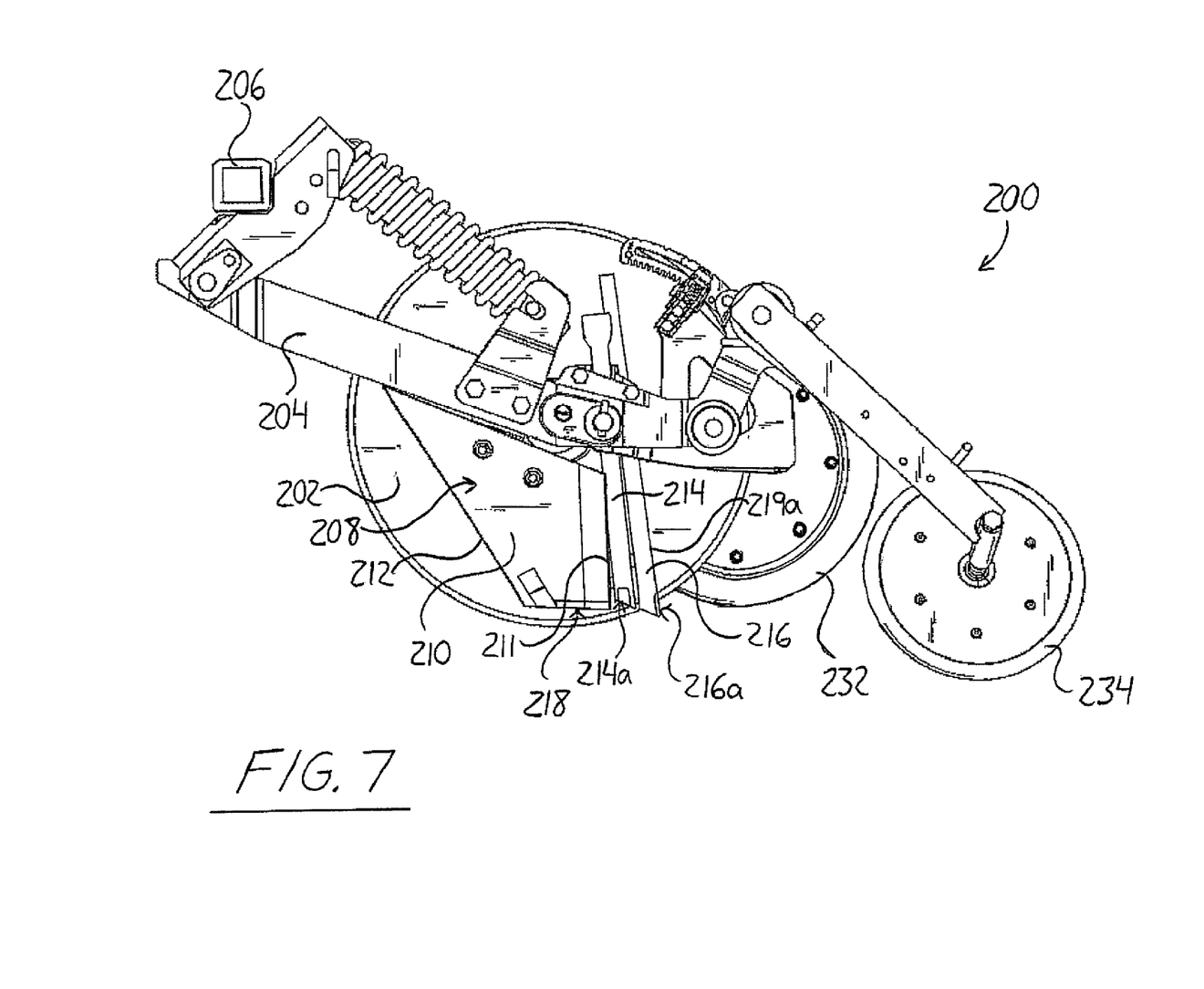
FIG. 7 is a side elevational view of a disc furrow opener according to a third embodiment of the present invention.

FIG. 7 shows a single-disc furrow opener according to a third embodiment of the present invention. In a known manner, the opener 200 features a disc 202 rotatably supported on a mounting arm 204 assembly attached to a tool bar 206 of a work vehicle (not shown) for pulling in a forward working direction thereby to open a furrow in the ground over which the work vehicle is driven. A scraper 208 is carried with the mounting arm assembly 204 by an existing mount depending downward therefrom at a position along the disc 202 on a trailing side of the disc in a manner similar to that described herein above for the other preceding embodiments. The scraper 208 is defined in part by a plate or planar member 210 similar to the scraper plate 22 of the preceding embodiments, but without the side deflector plate 44, bottom firming plate 48 and seed positioning plate 66. The third embodiment scraper plate 210 thus also defines a front scraper edge 212 positioned generally against the disc to scrape soil buildup therefrom and extends away from this front scraper edge 212 at a lower end thereof to trail it in the forward working direction and have its bottom edge extend obliquely away from the disc in a generally horizontal plane disposed upward from a lowermost point on the disc to form a seed shelf in a respective side of the furrow. The lack of side deflector plate and seed positioning plate avoids the possibility of these components pushing up against the disc under movement of flexing of the scraper plate during use of the opener.

A seed delivery tube 214 and a fertilizer delivery tube 216 are fixed together and carried on the mounting arm assembly 204 by a single mount fastened thereto on the trailing side of the disc at a position along the disc (i.e. between leadingmost and trailingmost portions of a planar projection of the round disc's perimeter projected perpendicularly from the plane of the disc to a plane in which the element in question lies). The seed outlet 214a formed by an open bottom portion of the metal seed tube 214 on the trailing side of the disc is in also in a position along the disc, trailing just behind the scraper 208 in the forward working direction and is situated laterally outward from the disc 202 within a space spanning from the disc 202 to the rear or trailing end 211 of the scraper plate 210 in a direction normal to the rotational plane of the disc 202 so as to deposit the seed onto the seed shelf formed by the extension of the scraper 208 away from the disc. The fertilizer outlet 216a of the fertilizer tube 216 just trails the seed outlet 214a, being adjacent thereto on the same side of the disc 202 at a respective position therealong. The fertilizer outlet is also situated adjacent the disc in close proximity thereto within the aforementioned space defined between the disc and the trailing end 211 of the scraper plate furthest from the disc, thereby facilitating the release of fertilizer into the furrow for deposit on the bottom thereof below the seed shelf.

Figure 9:
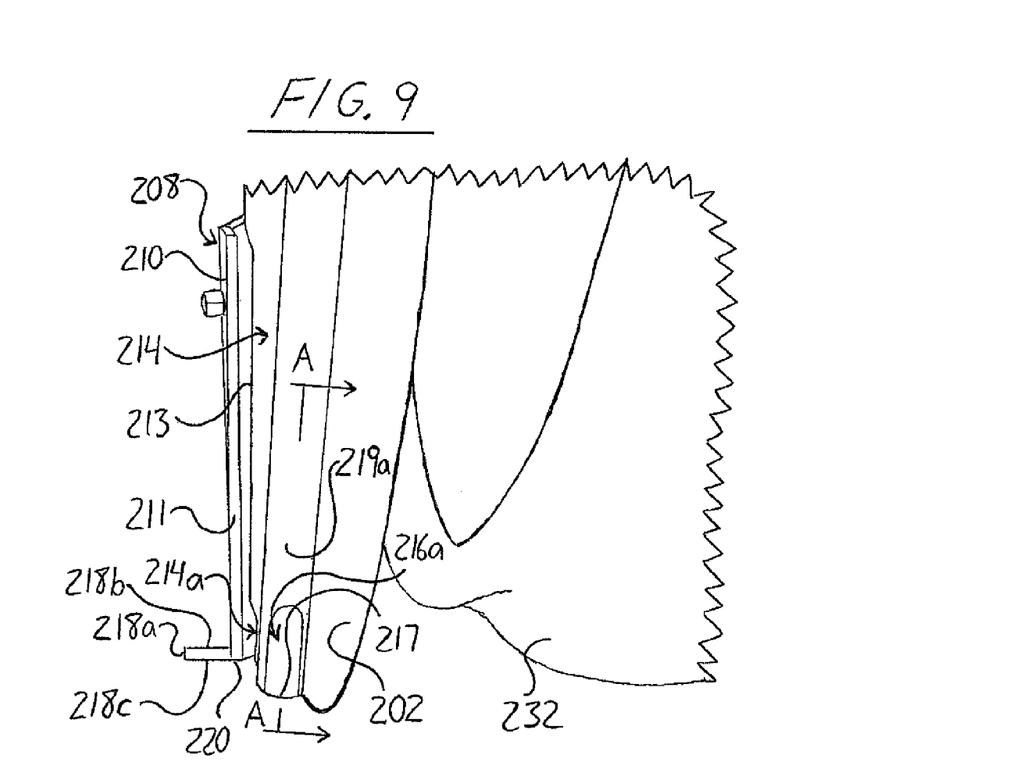
FIG. 9 is a close-up partial view of the opener of FIG. 7 from rearward of the disc thereof.

Due to the limited width of the aforementioned lateral space between the disc 202 and the scraper plate 210, as defined by the distance therebetween in the direction normal to the plane of the disc at the rear end 211 of the scraper plate, the seed and fertilizer outlets 214a,216a of the illustrated embodiment generally align or at least overlap along this direction as shown in FIG. 9, as the space may not be sufficient to position the fertilizer tube between the seed tube 214 and the disc 202 in a side-by-side arrangement having the tubes disposed directly over only their respective ones of the furrow bottom and the seed shelf. The seed tube 214 and the scraper 208 are thus provided with features to encourage positioning of seed discharged through the seed tube on the seed shelf and reduce the falling of seed down therefrom into the bottom of the furrow.

Figure 8:
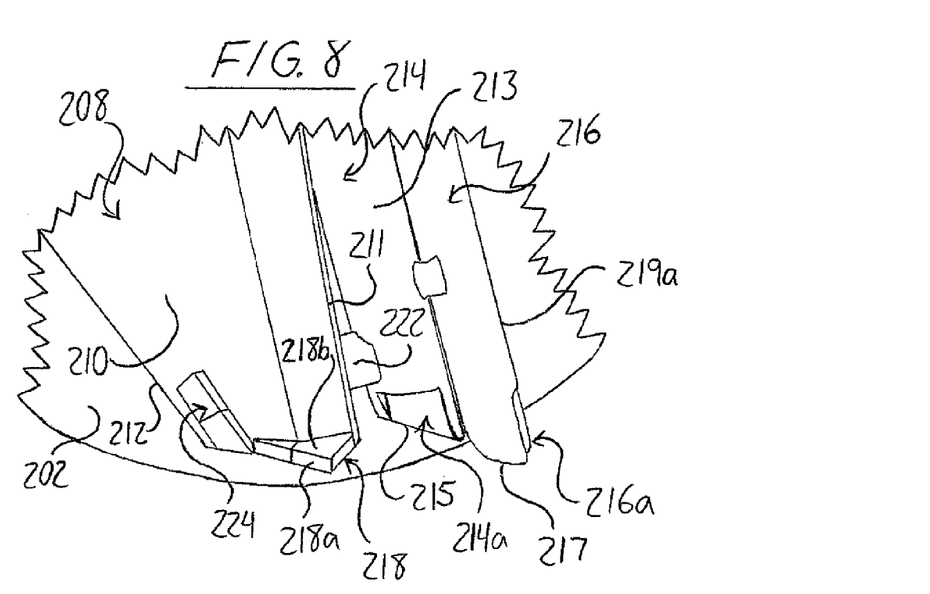
FIG. 8 is a close-up partial side view of the opener of FIG. 7.

A seed shelf wing 218 is fixed to the scraper plate 210 to extend along the bottom edge 220 thereof, which extends rearward from the bottom end of the scraper edge 212 obliquely away from the disc 202. The wing 218 extends to the rear edge 211 of the scraper plate and projects to a side of the scraper plate 210 opposite the disc. The wing 218 is plate-like or relatively thin in the vertical direction, projecting generally perpendicularly and horizontally from the scraper plate 210 in a generally planar manner. The wing 218 has an outer edge 218a opposite the scraper plate 210 that is generally linear and disposed at a greater obliquely acute angle relative to the plane of the disc 202 than the bottom edge 220 of the scraper plate 210 in the rearward direction such that the wing narrows in the forward working direction. During use of the opener, the wing 218 cuts into the soil at the side of the furrow further than with the scraper plate 210 alone, lifting dirt over it as it is pulled in the forward working direction, thereby increasing the width of the seed shelf defined by the opener such that seeds deposited thereon through the seed outlet 214a are less likely to and fall off the seed ledge deeper into the furrow. The wing 218 is made of a harder material than the scraper plate 210, such as a tungsten carbide wing brazed to a steel scraper plate, to provide increased durability and longer wear-life. As shown in FIG. 8, the wing 218 may be formed of more than a single piece of hardened material fixed to the scraper plate 210 in an end-to-end arrangement therealong to collectively define the wing's outer edge 218a.

Figure 12:
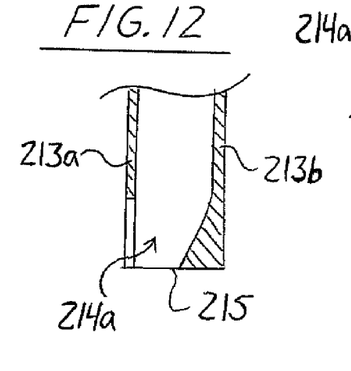
FIG. 12 is a partial cross sectional view of a seed tube of the tube assembly of FIG. 10 as taken along line B-B thereof.

The seed outlet 214a opens not only at the very bottom of the seed tube 214 to allow dropping of seeds through the tube's open bottom, but also opens laterally through a removed portion of the seed tube wall cut away from a side 213a of the seed tube 214 opposite the disc 202 at the bottom end 215 of the seed tube for a short distance upward therefrom. In other words, the wall of the seed tube 214 depends further downward on its inward (nearest the disc), forward (leading) and rearward (trailing) sides than at the side 213a opposite the disc 202, thereby encouraging a outwardly horizontal lateral component to the discharge motion of seed released from the seed tube 214 through its outlet 214a away from the disc 202 toward the seed shelf. The opposite side 213b of the seed tube wall nearest the disc 202 at the seed outlet 214a is shaped to slope its interior surface, facing the outer side 213a, downwardly away from the disc 202 as shown in FIG. 12 to further encourage such laterally outward discharge of seed from the seed tube 214 far onto the seed shelf further from the edge thereof that drops off into the bottom of the furrow. In the figures, the sloped inner surface of inner side 213b does not extend fully across the interior of the seed tube 214 to completely close off its bottom end 215, thereby ensuring that seed being given a lateral component of motion by contact with or sliding along this sloped surface during exit from the seed outlet 214a retains a significant downwardly vertical component of motion to better encourage positioning of seed onto the seed shelf below the soil lifted therefrom by the wing 218 leading the seed tube outlet 214a.

The bottom end 215 of the seed tube 214 is cut at an oblique angle relative to the longitudinal axis thereof to slope upward in the forward working direction so that the bottom 215 of the seed tube 214 defining the bottom of the seed outlet opening 214a has its forwardmost end situated at a height generally equal to or just above that of the top surface 218b of the planar wing 218 and its rearwardmost end at a height generally equal to that of the bottom surface 218c of the planar wing 218. The positioning of the seed outlet 214a just rearward of the scraper plate 210 and wing 218 to open at a height closely proximate that of the wing 218 acts to discharge seed onto the seed shelf being cut by the scraper plate 210 and wing 218 just below the scraper wing 218, beneath the soil lifted thereby to form the shelf. The fertilizer outlet 216a adjacent the seed outlet 214a just rearward thereof has a generally matching slope, the bottom 217 of the fertilizer tube 216 having been cut at approximately the same angle and positioned with its forwarmost end at about the same height as the rearwardmost end of the seed tube bottom 215. The bottom 217 of the fertilizer tube 216 thus extends slightly downward in the rearward direction to a height slightly below the wing 218, thereby encouraging the delivery of fertilizer into the furrow below the seed shelf formed therein by the scraper 208.

Figure 11:
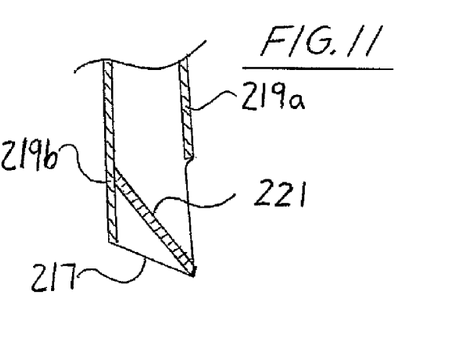
FIG. 11 is a partial cross sectional view of a fertilizer tube of the tube assembly of FIG. 10 as taken along line A-A of FIG. 9.

Like the seed tube 214, the fertilizer tube 216 has a portion of its wall cut away from the bottom end 217 of the tube on a single side thereof. Unlike the seed tube 214 however, the cut away portion of the fertilizer tube wall is not at the side facing away from the disc 202, but instead is located in the rearward side 219a of the fertilizer tube 214 facing away from the forward working direction. This rearward facing opening in the fertilizer tube extends upward therealong to a height generally at or just above that of the top surface 218b of the planar wing. To ensure the release of fertilizer from the fertilizer tube 216 in a rearward direction through this rearward facing opening in the rear side 219a of the fertilizer tube wall and thereby encourage separation from the seed being delivered through the seed tube 214, a fertilizer directing plate 221 is mounted within the fertilizer tube 214 at the fertilizer outlet 214a defined at a portion thereof adjacent the bottom end 219. This directing or guiding plate 221 substantially spans a full width of the fertilizer tube interior, measured between the side walls facing toward and away from the disc at their exterior surfaces, and slopes obliquely downward from a forward side 219b of the fertilizer tube 216 to the bottom end 217 thereof at the rear side 219a, as shown in FIG. 11. The directing plate 221 thus directs or guides fertilizer falling through the fertilizer tube 216 outward therefrom through the cut away opening in the rear side 219a of the tube wall that extends upward over the directing plate 221. The other sides of the fertilizer tube wall are left intact above the directing plate 221 at the fertilizer outlet 216a to ensure exit through the rearward facing opening and prevent lateral delivery from the fertilizer tube away from the disc 202 onto the seed shelf.

The intact forwardmost side of the fertilizer tube wall and rearwardmost side of the seed tube wall and the definition of a rearwardly downward sloping guiding surface by the directing plate 221 define barriers between the discharge openings or release points of the fertilizer and seed outlets 216a,214a to keep the fertilizer and seed separate, for delivery to the furrow bottom and seed shelf respectively. With the width of the seed shelf increased by the wing 218 and the formation of a downward and laterally outward sloping guide surface at the interior of the inner side 213b of the seed tube wall to encourage an outward kicking effect of seeds away from the disc during discharge from the seed tube, even if some fertilizer is deposited on the seed shelf near the edge thereof that drops-off down to the furrow bottom, the seed will tend to end up closer to the opposite outside end of the seed shelf and thus be spaced sufficiently from the fertilizer to avoid detrimental effect to the seed.

Figure 10:
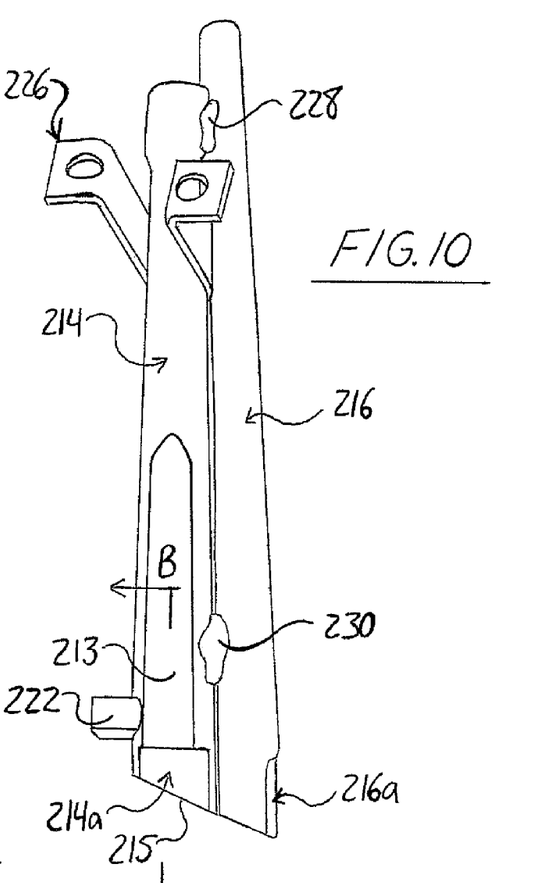
FIG. 10 is a side perspective view of a tube assembly of the opener of FIG. 7 shown in isolation.

With reference to FIGS. 8 and 10, a blocker 222 is carried with the seed and fertilizer tubes to project forward therefrom to a position directly between the scraper plate 210 and the disc 202 to limit movement or flexing of the scraper 208 toward the disc during use of the opener 200. In the figures, the blocker 222 is defined by a solid body welded to the seed tube 214 just above the seed outlet 214a thereof to project forward therefrom and block movement of the scraper plate 210 inward toward the disc 202 past the cut-away outward-facing side 213a of the seed tube 214 so that the seed outlet 214a and fertilizer outlet 216a remain in the aforementioned space laterally outward from the disc but inward of the scraper plate's rearmost end 211. The outlets thus remain in the shadow of the scraper 208 for protection thereby during pulling in the forward working direction.

In addition to the wing 218, a further insert 224 having a hardness greater than the scraper plate 210 is fixed to the surface thereof facing away from the disc 202 to extend along the scraping edge 212 proximate thereto upward from the bottom edge 220, for example a carbide insert brazed onto a steel scraper plate. In the figures, the insert 224 is positioned generally immediately forward of the wing 218 extending generally fully to the rear edge of the scraper plate 210 to provide increased hardness along substantially the full length of the scraper plate 210 from near the scraper edge 212 to its rear end 211 thereopposite. This increased hardness better resists wear of the scraper provide a well-formed seed shelf for a longer lifespan. For example, the use of carbide inserts for the wing 218 and scraper plate protection insert 224 on a steel scraper plate 210 increases the lifespan over which a clean, high-quality seed shelf can be formed relative to an entirely steel scraper construction, while keeping increase in production cost relatively low by using the stronger carbide only in regions that may otherwise wear quickly or have significant negative affect on performance when worn.

FIG. 10 shows a tube assembly 226 defining the seed tube 214 and fertilizer tube 216 of the opener 200 of FIGS. 7 to 9. The seed tube 214 is equipped with a mounting bracket 216 in a known manner, the bracket 216 having a u-shaped portion wrapped about the external surface of the tube wall at the inner side 213b thereof to situate an open end of the u-shaped portion past the opposite outer side 213a. This open end of the u-shaped portion features a flange on each leg thereof, projecting outward away from the opposite leg. The two flanges are then bolted to the arm assembly 204 at a side thereof at which the disc 202 is carried. Prior to fastening the mount 216 to the arm assembly 204, the fertilizer tube is fixed to the seed tube 214 to extend generally therealong, for example by welds 228, 230 proximate the top end of the seed tube above the mount 226 and proximate the bottom end of the seed tube above the seed and fertilizer outlets 214a,216a and the blocker 222 respectively, as shown in FIG. 10. In this arrangement, the mounting bracket 216 extends about the seed tube between the welds 228,230 to pass one of its legs between the two tubes. It should be appreciated that other mounting arrangements may be used to suitably position the devices through which the seed and fertilizer are delivered into the furrow need not necessarily be two distinct tubes fastened together, either directly or by way of each tube being separately fastened to a common mount shared by the two tubes, but alternatively, for example, could be defined by a singular body having two channels or conduits extending through it to define the seed and fertilizer outlets and corresponding inlets fed by respective seed and fertilizer sources.

As an alternative to sale of the entire opener of FIG. 7, the opener of FIG. 7 may be produced by modification of an existing disc opener, for example by adding a fertilizer tube to a single-shoot scraper-equipped disc opener arranged to deposit seed on a shelf formed by the scraper or by mounting the above-described dual-tube arrangement in place of the single tube of such an opener. Further replacement of the existing scraper of such an opener with the wing-equipped opener described above will improve the quality of the seed shelf to improve seed retention thereon for improved seed placement for consistent emergence and better separation of the seed and fertilizer. As illustrated by FIG. 7, the opener may be equipped with a gauge wheel 232 and packer wheel 234 in a known manner.

The openers described herein each simultaneously pull the disc through the soil to open a furrow and pull the scraper through the furrow to form a seed shelf in the side wall of the furrow and simultaneously deliver seed onto the seed shelf and fertilizer into the bottom portion of the furrow below the seed shelf. With the tubes situated rearward of the front edge of the scraper disposed against the disc, but at positions along the disc and not rearwardly outward beyond the rearmost point on the disc perimeter's rotational path, the seed and fertilizer are deposited within their respective parts of the furrow before the soil closes back over the furrow rearward of the disc. Therefore, no additional opening utensils beyond the single disc and its scraper are required to facilitate placement of seed.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A disc furrow opener for single pass placement of seed and fertilizer, the opener comprising:
   a mounting arm;
   a disc rotatably supported on the mounting arm for pulling therewith in a forward working direction to open a furrow in the ground, including a bottom portion of the furrow that features a furrow bottom defined by a lowermost point on the disc;
   a scraper carried with the mounting arm on a trailing side of the disc and defining a front scraper edge positioned to scrape soil buildup from the disc, the scraper extending away from the front scraper edge at a lower end thereof disposed upward from a lowermost point on the disc to trail the front scraper edge in the forward working direction and extend away from the disc along a plane to form a seed shelf in a respective side of the furrow above the bottom portion of the furrow;

a seed delivery device operable to discharge seed therefrom through a seed outlet thereon into the furrow, the seed delivery device being carried with the mounting arm with the seed outlet situated on the trailing side of the disc in a position trailing the front scraper edge of the scraper in the forward working direction to deposit the seed onto the seed shelf; and a fertilizer delivery device operable to discharge fertilizer therefrom through a fertilizer outlet thereon into the furrow, the fertilizer delivery device being carried with the mounting arm and having the fertilizer outlet situated on the trailing side of the disc and in a position trailing the front scraper edge of the scraper in the forward working direction to direct fertilizer toward the furrow bottom and into the bottom portion of the furrow below the seed shelf.

2. The furrow opener according to claim 1 wherein the seed outlet on the seed delivery device is closer, along the disc, to the front scraper edge than the fertilizer outlet on the fertilizer delivery device.

3. The furrow opener according to claim 1 wherein the scraper comprises a scraper plate defining the front scraper edge and having a bottom edge extending away therefrom at the lower end thereof at an oblique angle to the disc.

4. The furrow opener according to claim 3 further comprising a seed shelf projection extending from the scraper plate to a side thereof opposite the disc to define a width of the seed shelf.

5. The furrow opener according to claim 4 wherein the seed shelf projection is formed of a harder material than the scraper plate.

6. The furrow opener according to claim 4 wherein the seed shelf projection comprises carbide.

7. The furrow opener according to claim 3 wherein the fertilizer outlet on the fertilizer delivery device trails the scraper plate.

8. The furrow opener according to claim 3 wherein the seed outlet on the seed delivery device trails the scraper plate in the forward working direction.

9. The furrow opener according to claim 3 wherein at least a portion of the seed delivery device is disposed between the scraper plate and the disc to block movement of the scraper plate toward the disc past a side of the seed outlet facing away therefrom.

10. The furrow opener according to claim 9 wherein the seed delivery device comprises a seed tube extending downward to the seed outlet and a blocking projection fixed to the seed tube and extending therefrom to a blocking position between the scraper plate and the disc.

11. The furrow opener according to claim 1 wherein the seed outlet opens to a side of the seed delivery device opposite the disc.

12. The furrow opener according to claim 11 wherein the seed outlet comprises a seed guide surface which slopes downwardly away from the disc.

13. The furrow opener according to claim 1 wherein the fertilizer delivery device trails the seed delivery device in the forward working direction.

14. The furrow opener according to claim 1 wherein the seed delivery device and the fertilizer delivery device comprise a seed tube and a fertilizer tube fastened together.

15. The furrow opener according to claim 1 wherein the seed outlet and the fertilizer outlet are adjacent one another.

16. The furrow opener according to claim 1 wherein the fertilizer outlet opens to a side of the fertilizer delivery device opposite the scraper edge in the forward working direction.

17. The furrow opener according to claim 16 wherein the fertilizer outlet comprises a fertilizer guide surface which slopes downwardly away from the scraper edge in the forward working direction.

18. The furrow opener according to claim 1 wherein the fertilizer outlet is disposed within a lateral distance extending normally from a rotational plane of the disc to an end of the scraper opposite the scraper edge.

* * * * *